Figure 1:
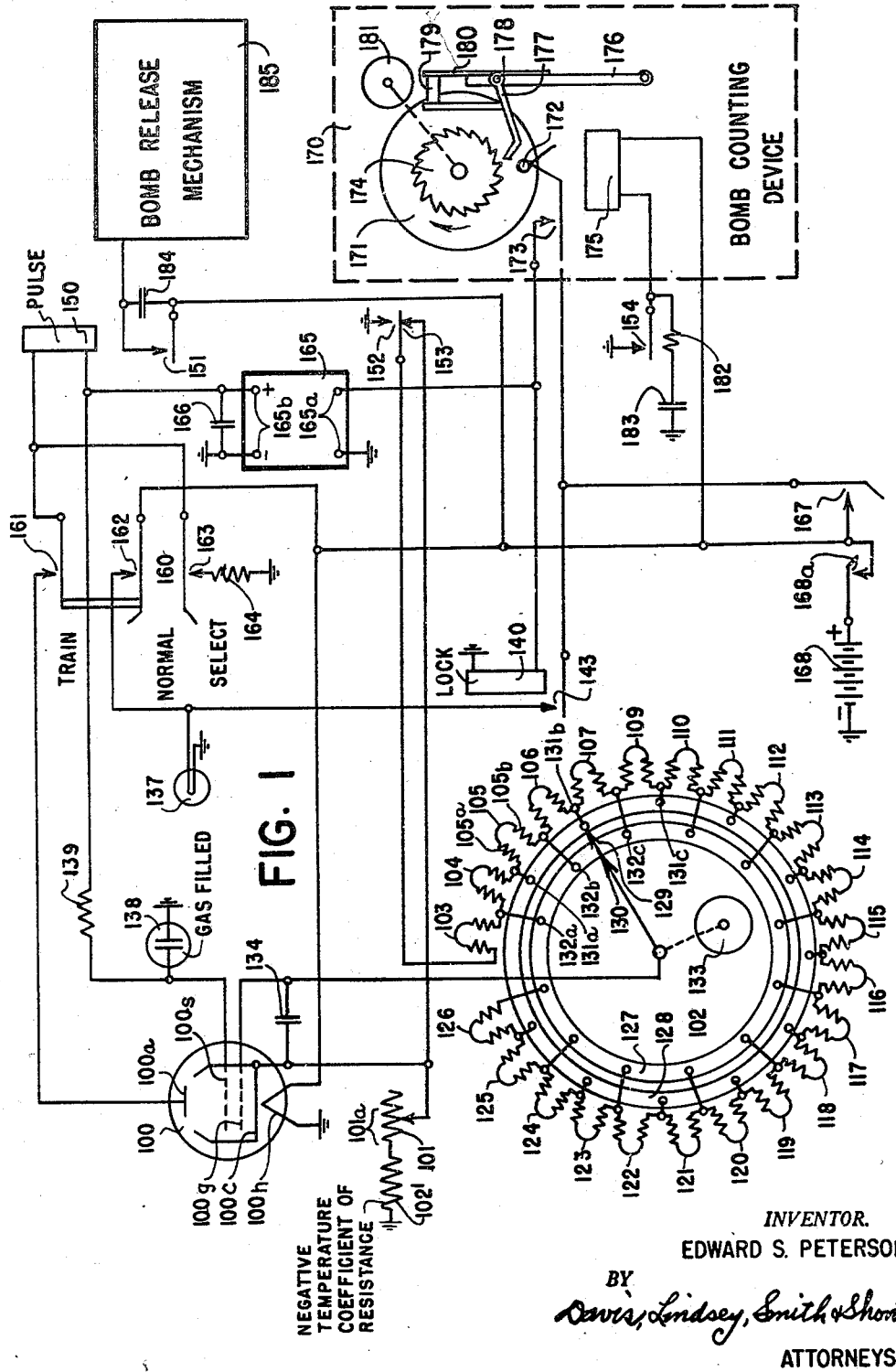

March 5, 1946. E. S. PETERSON 2,396,197
APPARATUS FOR CONTROLLING THE RELEASE OF BOMBS FROM AIRCRAFT
Filed Dec. 30, 1942 5 Sheets-Sheet 3

INVENTOR.
EDWARD S. PETERSON
BY
Davis, Lindsey, Smith & Shonts
ATTORNEYS

March 5, 1946. E. S. PETERSON 2,396,197
APPARATUS FOR CONTROLLING THE RELEASE OF BOMBS FROM AIRCRAFT
Filed Dec. 30, 1942 5 Sheets-Sheet 4

*INVENTOR.*
EDWARD S. PETERSON
BY
Davis, Lindsey, Smith & Shonts
ATTORNEYS

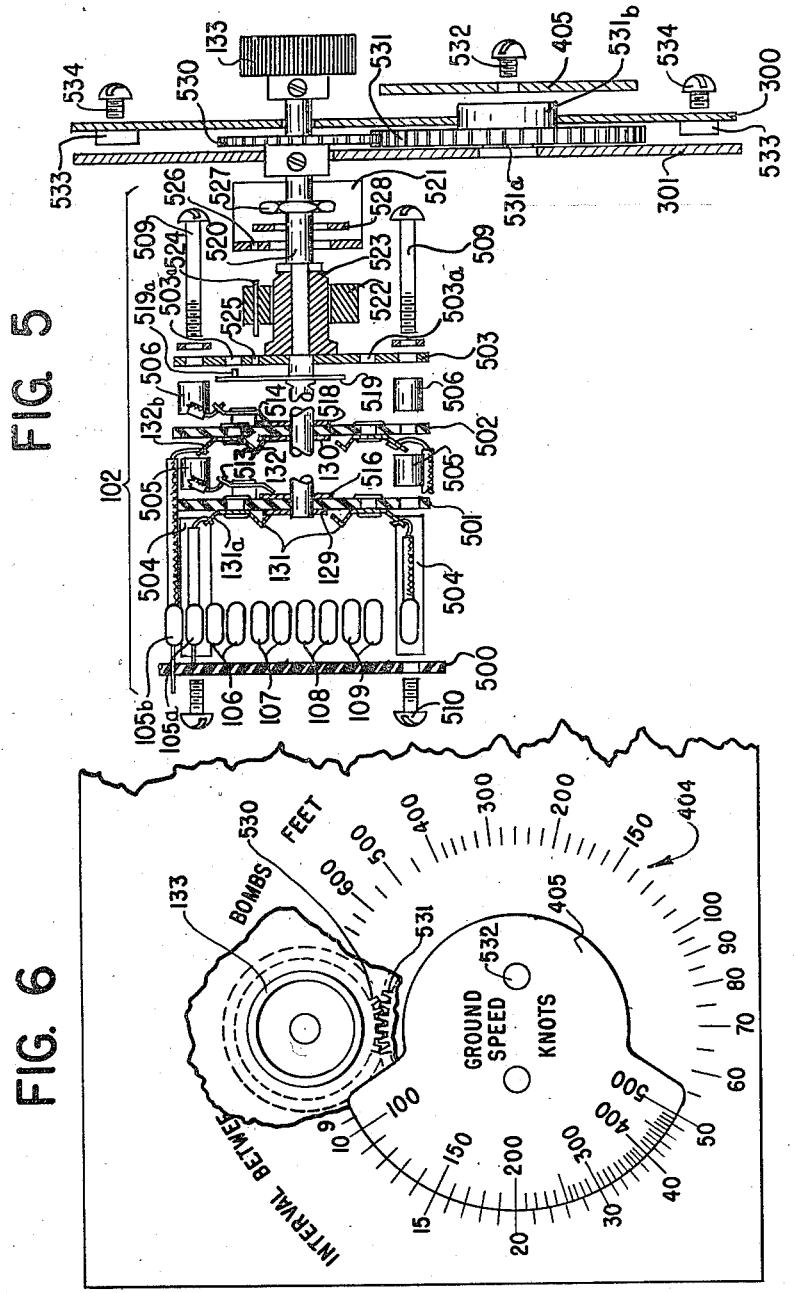

Patented Mar. 5, 1946

2,396,197

UNITED STATES PATENT OFFICE 2,396,197

APPARATUS FOR CONTROLLING THE RELEASE OF BOMBS FROM AIRCRAFT

Edward S. Peterson, Elmwood Park, Ill., assignor to Automatic Electric Laboratories, Inc., a corporation of Delaware Application December 30, 1942, Serial No. 470,590

10 Claims. (Cl. 177—380)

The present invention relates to apparatus for controlling the release of bombs from an aircraft and, more particularly, to improvements in apparatus for so timing the release of bombs from an aircraft that a predetermined spacing between bomb hits on an objective may be obtained. This application is a continuation-in-part of copending application Serial No. 451,513, filed July 18, 1942.

In certain bombing operations the maximum effectiveness is obtained by releasing the bombs in trains and at spaced intervals, such that a predetermined spacing interval between hits on the objective is obtained. For example, in bombing troop columns, supply trains or the like, the maximum destructive power is obtained by releasing the bombs at such intervals that the zone of destruction of one exploding bomb of the train just overlaps the zone of destruction of the preceding and succeeding bombs of the train. The spacing between hits on such an objective is, of course, determined by the ground speed of the aircraft from which the bombs are released and the time interval separation between the release of successive bombs of the train. To correlate these factors so that any desired spacing interval between bomb hits on the objective may be obtained while the aircraft is traveling at a predetermined but variable speed, it is necessary to provide a device for measuring the time interval between the release of successive bombs of the train. Such a device must be readily adjustable to vary the measured time intervals so that any desired spacing between bomb hits on the objective may be obtained at any ground speed of the craft from which the bombs are released.

It is an object of the present invention to provide electrical timing apparatus of the character described, which is of simple and rugged construction, is easy to adjust and operate, is thoroughly reliable in operation at any air pressure and under widely varying temperature conditions, and is light in weight.

According to another object of the invention, provisions are made in the apparatus for preventing variations in the timing operations of the apparatus regardless of wide variations in the voltage of the current supply source from which the component parts of the apparatus are energized.

In accordance with a further object of the invention, improved facilities are provided in the apparatus for insuring the start of the bomb release operations within a short predetermined time interval after the bomb release key, button or other device is operated.

According to still another object of the invention, provisions are made in the apparatus for adjusting the circuit equipment to obtain a desired uniform ratio between the bomb release intervals and the bomb spacing intervals, regardless of the periodicity of bomb release and regardless of manufacturing variations in the component parts of the circuit equipment.

It is a further object of the invention to provide improved apparatus of the character described, which includes a presettable device for terminating the bomb release operations after a predetermined number of bombs, determined by the setting of the device, have been released.

It is still another object of the invention to provide, in combination with bomb spacing interval control element of the apparatus, improved indicating facilities which are so arranged that for any setting of the control element the relationship between the ground speed of the aircraft and the spacing between bomb hits on the objective is clearly indicated thereby.

Figure 2:
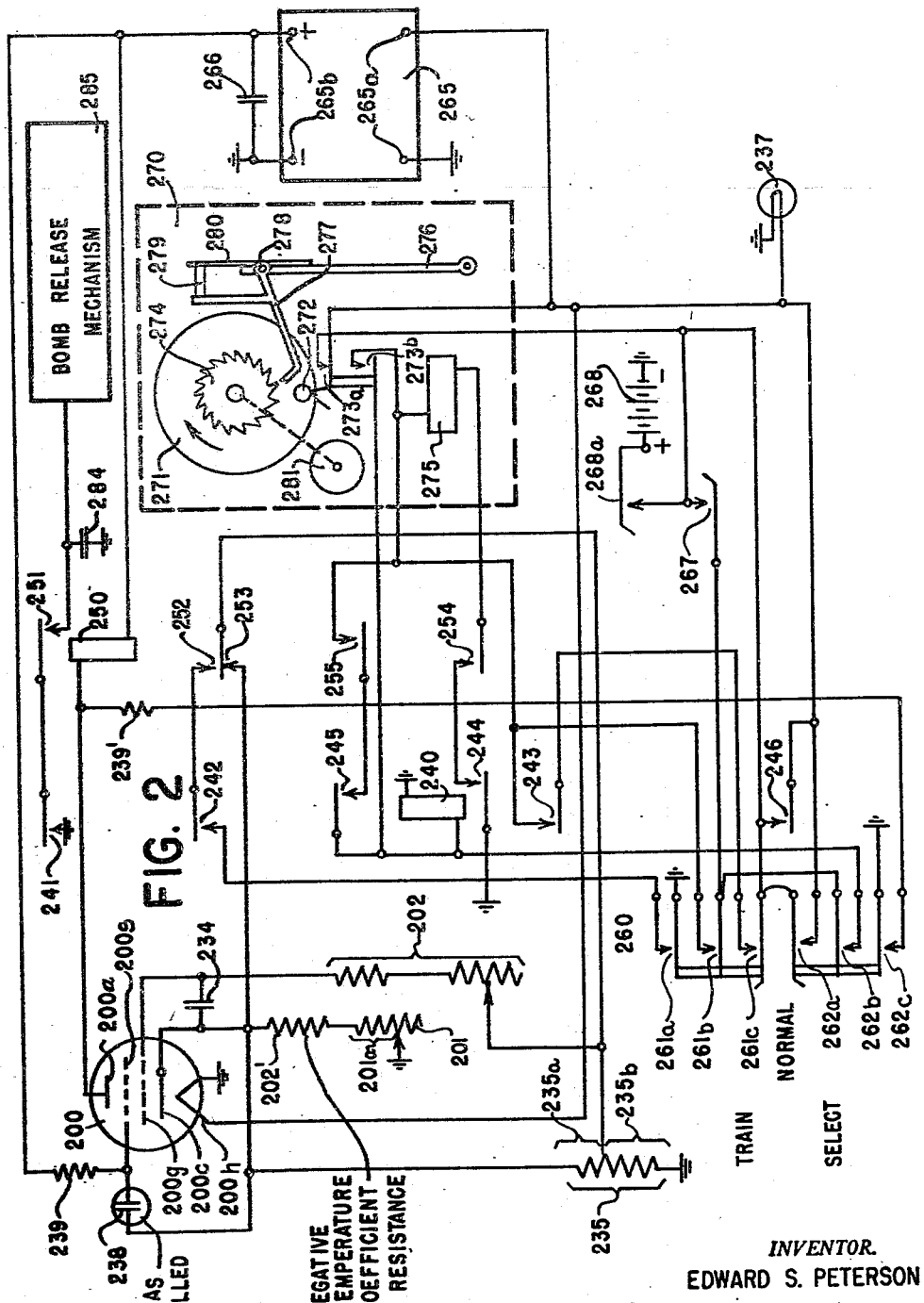

The invention, both as to its organization and method of operation, together with further objects and advantages thereof, will best be understood by reference to the specification taken in connection with the accompanying drawings in which Fig. 1 illustrates the circuit arrangement of improved bomb release timing apparatus, characterized by the features of the present invention; Fig. 2 illustrates a modification of the circuit arrangement shown in Fig. 1; and Figs. 3, 4, 5 and 6 illustrate the mechanical construction and arrangement of improved apparatus which may be wired either in accordance with the circuit shown in Fig. 1 or the circuit shown in Fig. 2.

Referring now more particularly to Fig. 1 of the drawings, there is schematically illustrated a bomb release mechanism 185 of the electromagnetically controlled type now in use on modern bombing planes. Without regard to the mechanical construction of this mechanism, it may be pointed out that the mechanism is adapted successively to release a train of bombs from the bomb bay of the plane in which it is mounted, in response to a train of current impulses of corresponding numerical value. More specifically, the arrangement of the mechanism is such that one bomb is released thereby in response to each received current impulse and the periodicity of the received impulses may be varied to correspondingly change the rate at which the bombs are released thereby. The arrangement of the mechanism may be such that the spacing interval between the release of any two bombs of the train is determined either by the open-circuit or the closed-circuit period of the impulse. In general, however, the mechanism is so designed that for reliable operation the received impulses should be divided equally as between the make and break periods thereof, this being true regardless of the periodicity of the received impulses in a train.

In general, the improved apparatus for controlling the transmission of impulses to the release mechanism 185 comprises a control tube 100 having a timing network, which comprises the condenser 134 and the resistance of the adjustable rheostat 102, included in the input circuit thereof, and a pulsing relay 150 having a winding adapted to be included in the output circuit of the tube 100 in series with the source of anode potential 165 and an adjustable biasing resistor 101. The electron discharge tube 100 is of the well known pentode type having an anode 100a, a cathode 100c, a cathode heater 100h, a control grid 100g and a screen electrode 100s. Preferably this tube is of the well known commercial 25L6 type. The characteristics of this tube are such that if a constant potential is maintained upon the screen electrode thereof and the bias voltage impressed between the input electrodes 100c and 100g is maintained at a fixed value, the space current flow therethrough is held substantially constant regardless of wide variations in the voltage applied to the anode 100a thereof. Stated in other terms, the characteristics of the tube are such that by holding the potential of the screen electrode 100s constant, wide variations in the voltage applied to the anode 100a do not produce any substantial variation in the space current flow through the tube. For the purpose of maintaining the potential applied to the screen electrode 100s substantially constant regardless of wide variations in the voltage appearing across the output terminals of the source 165, a voltage regulating arrangement is provided which comprises a gas filled electric discharge tube 138 shunting the output terminals of the source 165 in series with the voltage regulating resistor 139. The tube 138, which may be of the well known neon type, for example, has the characteristic of maintaining a substantially constant voltage across its electrodes regardless of the magnitude of space current flow therethrough after the gas surrounding these electrodes is ionized to provide a conductive space current path. This tube as provided in the illustrated circuit is designed to have a normal operating voltage which approximates the normal screen voltage rating of the tube 100. In order to render the operation of the apparatus substantially independent of variations in the ambient temperature, a resistor 102' having a negative temperature coefficient of resistance is provided in the cathode circuit of the tube 100. This resistor, whose resistance decreases with rising temperature, has the effect of compensating or offsetting changes in the rate at which impulses are produced by the apparatus which would otherwise be caused by large changes in the temperature of the other circuit elements. Although any carbon or ceramic resistor having the proper negative temperature coefficient of resistance may be used, the resistor 102' is preferably of the type manufactured by the Keystone Carbon Company, Inc., of Saint Marys, Pennsylvania, having a negative temperature coefficient at 20° centigrade of 0.02 ohm/ohm/° centigrade.

The arrangement of the illustrated apparatus is such that the bomb release mechanism 185 may be manually controlled by the bomb release switch 167 to release the bombs held in the bomb bay of the craft one at a time, or automatically controlled to release a number of bombs in a predetermined train. To this end, a control switch 160 is provided. This switch is of the snap-acting type and is provided with three positions, i. e., a normal position wherein all of the contacts thereof are disengaged, a train position wherein the contacts 161 and 162 are respectively engaged to condition the apparatus to release a train of bombs in response to one operation of the switch 167, and a select position wherein the apparatus is conditioned to release a single bomb in response to each operation of the switch 167. In order visually to indicate to a bombardier that the switch 160 has been operated to its train position, a signal lamp 137 is provided.

For the purpose of counting the released bombs of a train and, more specifically, that of counting the impulses transmitted by the pulsing relay 150 to the bomb release mechanism 185, a presettable counting device 170 is provided. This device may be preset to cause the release of any desired number of bombs in a train and, operating in conjunction with the locking relay 140, is arranged to terminate the transmission of impulses to the bomb release mechanism 185 after bombs, corresponding in number to the setting of the device, have been released by this mechanism. In order to initiate the operation of the apparatus to cause the release of a train of bombs at the exact instant that the bombsight is brought to bear upon the leading end of an objective, the button or key-operated, self-restoring switch 167 is provided. Current for energizing the control elements of the bomb release mechanism 185, the windings of the relays 140 and 150, the stepping magnet 175 of the counting device 170, the cathode heater 100h, and the filament of the signal lamp 137 is derived from a current source 168. For convenience in describing the circuits, this source is shown as a battery. In practice, however, this source may comprise a small motor driven generator having an output voltage that may vary over rather wide limits. This source may, in the usual installation, have a voltage rating of approximately 26 volts, with an expected variation in this voltage of from 24 to 28.5 volts. If desired, a power switch 168a may be provided for disconnecting the positive or ungrounded terminal of this source from the illustrated circuit apparatus. The indicated screen and anode voltage source 165 is, in effect, a voltage step-up device having its input terminals 165a arranged to be connected across the terminals of the current source 168. This device is preferably of the mechanical vibrator type having an input voltage rating equal to that of the source 168 and an output voltage rating of approximately 200 volts. For the purpose of smoothing the direct output voltage appearing across the output terminals 165b thereof, a condenser 166 is connected in shunt with these terminals.

As shown in Figs. 3, 4, 5 and 6 of the drawings, most of the above-described parts of the apparatus are supported upon a chassis which comprises a front panel 300 and an inwardly disposed sub-panel 301, the two panels being held in spaced-apart relationship by means of columns 533 projecting inwardly from the front panel 300, and being secured together by means of assembly screws 534. The various parts of the apparatus are housed within a case 400 upon which the front panel 300 is mounted by means of suitable mounting screws. More specifically considered, the above-identified parts of the apparatus are directly supported upon the sub-panel 301. This sub-panel also carries sockets for receiving the control tube 100, the electric discharge tube 138 and the signal lamp 137 together with an outlet socket 302 through which connections may be brought out to the current supply source 168 and the contact springs of the bomb release switch 167.

Figure 3:
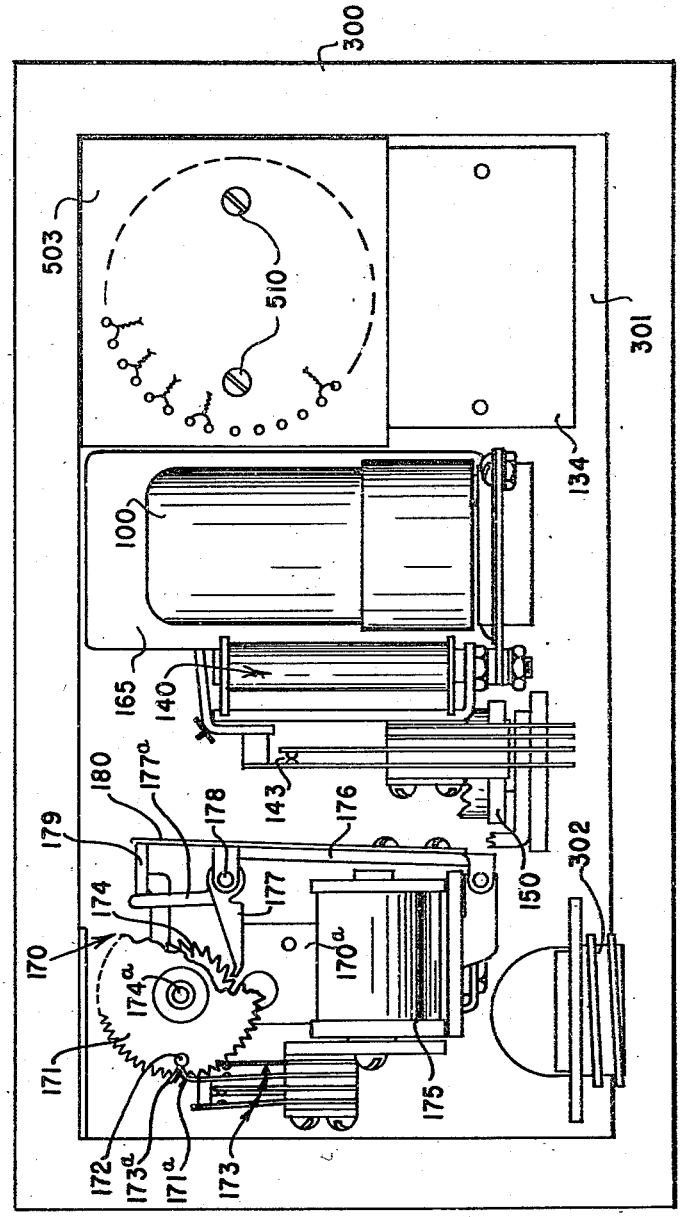
Figure 4:
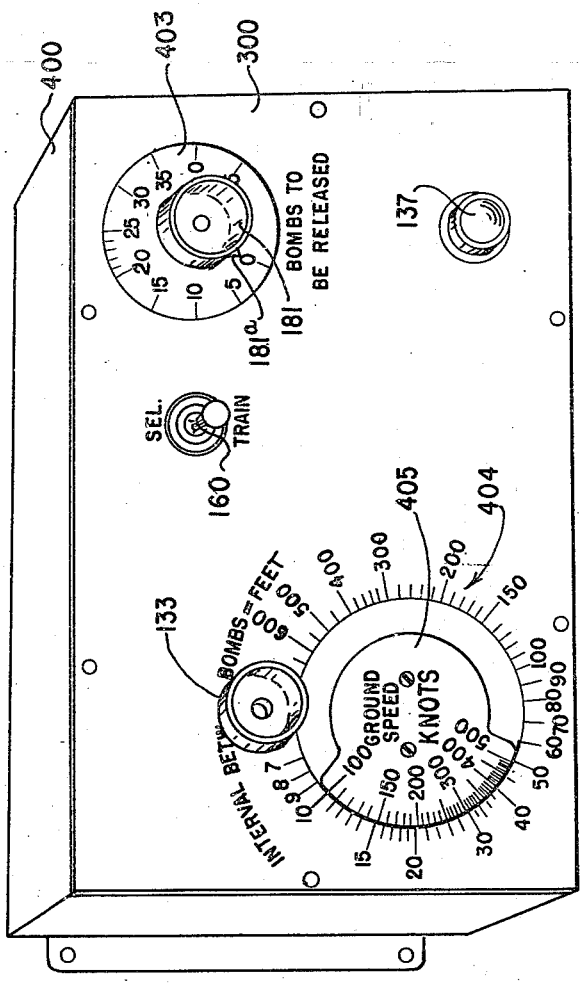

Briefly to consider the mechanical construction and arrangement of the counting device 170, the details of which are best shown in Fig. 3 of the drawings, it will be noted that this device comprises a frame 170a upon which the spring pile-up 173 is mounted. One of the movable contact springs of this pile-up is provided with a cam finger 173a which is normally engaged by a control pin 172 to maintain the movable and stationary contacts carried by the springs of the pile-up out of engagement. The pin 172 is carried by a detent wheel 171 which is rotatable with the ratchet wheel 174 and a stub shaft 174a rotatably mounted on the frame 170a. Rotation may be imparted to the shaft 174a and the two wheels 174 and 171 under the control of the pulsing relay 150 by means of the stepping magnet 175 acting in conjunction with the illustrated pawl mechanism. More specifically, the magnet 175 is carried by the frame 170a and is provided with an armature 176 which carries at the upper end thereof a pawl member 177. This pawl member is mounted on a pivot in 178 extending between the inturned ends of the armature 176, and is provided with a stop part 177a which is spring biased to engage the left edge of the frame projection 179. The pawl finger of the member 177 is normally restrained out of the path of rotation of the teeth on the ratchet wheel 174 by means of a leaf spring 180 which is secured flatwise against the outer surface of the armature 176 and is provided with an extended portion that engages the edge of the frame projection 179 opposite that engaged by the pawl member part 177a. From the above explanation it will be understood that each time the magnet 175 is energized to attract its armature 176, this armature is pivoted in a counterclockwise direction, as viewed in Fig. 3 of the drawings, against the bias of the leaf spring 180. Incident to this operation the pawl member 177 is pivoted and translated until the pawl finger thereof engages one of the teeth of the ratchet wheel 174. Continued movement of the armature 176 toward the pole face of the magnet 175 serves to rotate the shaft 174a and connected wheels 174 and 171 in the clockwise direction. The detent wheel 171 is provided for the purpose of insuring a precise and predetermined movement of the pin 172 in response to each operation of the magnet 175 and the associated pawl mechanism. To this end a centering spring 171a is provided which is anchored at one end to the frame 170a. The free end of this spring is provided with a return bent portion shaped accurately to conform to the tooth configuration of the teeth on the detent wheel 171. By virtue of the arrangement of the detent wheel 171 and the coacting centering spring 171a, this wheel and the pin 172 carried thereby are moved through the same predetermined angle in response to each energization of the stepping magnet 175, regardless of the length of the stroke imparted to the armature 176.

In performing a given counting operation, the device 170 functions to count the number of steps required to return the pin 172 from a preselected off-normal position to its normal position wherein it engages the cam follower portion 173a of one of the movable springs in the spring pile-up 173. In order to rotate the wheels 174 and 171 for the purpose of presetting the pin 172 to a desired off-normal position, the shaft 174a is provided with a portion which extends through openings provided in the two panels 301 and 300 and has mounted thereon a knob 181. This knob carries an indexing element 181a which, in cooperation with a circular scale 403 inscribed or otherwise formed on the outer surface of the panel 301, forms a convenient arrangement for indicating the setting of the pin 172. More specifically, the indicia of the scale 403 are suitably arranged to indicate the number of bombs which will be released during a given counting operation before the bomb release operations are terminated. In this regard it will be understood that since the finger of the pawl member 177 is normally held out of engagement with the teeth of the ratchet wheel 174, this wheel and the detent wheel 171 may be rotated in either direction by suitable manipulation of the knob 181.

The mechanical construction and arrangement of the rheostat 102 and the indicating means associated therewith is best illustrated in Figs. 1, 5 and 6 of the drawings. This rheostat is provided with a supporting structure comprising three panels 500, 501 and 502, and a camming plate 503 which are mounted in spaced-apart relationship by means of the spacing columns 504, 505 and 506 and the assembly screws 509 and 510. The three panels are constructed of insulating material such as fiber or the like and carry the electrical fixtures of the device. More specifically, the panel 501 carries a number of spaced-apart contact pieces 131 which are concentrically mounted about the center of the panel and are provided with inwardly disposed contact points which are adapted to be engaged by the end of a wiper 129 mounted for rotation with the operating shaft 520 of the device. The panel 502 similarly supports a number of contact pieces 132 having contact points arranged to be engaged by the end of a wiper 130 which is mounted for rotation with the operating shaft 520 of the device. As schematically indicated in Fig. 1 of the drawings, the contact pieces 131 and 132 are radially staggered about the axis of the shaft 520 while the contact making ends of the wipers 129 and 130 are in axial alignment. With this arrangement, and during rotation of the shaft 520, the contact pieces 131 and 132 are alternately engaged by their respective associated wipers 129 and 130. The two center panels 501 and 502 also carry terminal pieces 513 and 514, respectively, which are provided with inwardly extending contact making ends that are biased to engage collector rings 516 and 518 mounted for rotation with the shaft 520. In the illustrated wiring arrangement these two terminal pieces are connected together and to the control grid of the control tube.

The resistor elements 103 to 126, inclusive, as shown in Fig. 1 of the drawings, are connected in series-circuit relationship and the alternate junction points therebetween are connected to the contact pieces 131 and 132 in the order of the disposal of these contact pieces about the axis of the shaft 520. As thus arranged two resistor elements are connected in series between each adjacent pair of contact pieces. The purpose of using two series-connected resistor elements instead of a single element of higher resistance is to permit resistance matching such that the resistance connected between each adjacent pair of contact pieces is exactly that required to produce a desired change in the pulsing rate of the relay 150. In this regard it may be noted that, due to manufacturing variations, the individual resistors may have resistance values which vary as much as 10% plus and minus from a desired standard. Thus, if it is desired, for example, to provide a resistance between two of the contact pieces having a value of 1000 ohms, two resistor elements of 450 and 550 ohms, respectively, may be used. In short, the elements may be selected in matched pairs such that the exact desired values of resistance between the different pairs of contact pieces may be obtained.

The resistor elements 103, 104, 105, etc., are supported between the panel 500 and the soldering tails of the contact pieces 131 and 132. Thus the end of one lead-in wire to the resistor 105a is soldered to the soldering tail of the contact piece 131a and the other lead-in wire to this resistor is passed through an opening in the panel 500. Similarly, the end of one lead-in wire to the matching resistor element 105b is soldered to the soldering tail of the contact piece 132b and the other lead-in wire to this element is passed through an opening in the panel 500. The ends of the wires which extend from the two elements 105a and 105b through the adjacent openings in the panel 500 are twisted and soldered. Thus a rugged supporting structure for the elements is provided.

For the purpose of accurately controlling the movement of the shaft 520 so that, regardless of the setting thereof, the wiper 129 is accurately positioned to engage one of the contact pieces 131 or the wiper 130 is positioned accurately to engage one of the contact pieces 132, a camming arrangement comprising the panel or plate 503 and a cooperating camming element 519 rigidly secured to the shaft 520, is provided. More specifically, the plate 503 is provided with a number of openings 503a therethrough which are concentrically disposed about the axis of the shaft 520 and are radially aligned with the contact pieces 131 and 132 carried by the panels 501 and 502. The sections of this plate separating the openings 503a are filled out or raised to provide camming surfaces over which the cam finger 519a of the camming element 519 is adapted to ride as the shaft 520 is rotated from one position to a succeeding position. More specifically, the element 519 is in the form of a steel plate constructed from flat spring steel stock, and the cam finger 519a comprises a bent-out portion of the plate having a rounded edge which is adapted to ride over the raised camming surfaces between the openings 503a, and bridges one of these openings each time the shaft 520 is adjusted to a desired setting. With this camming arrangement, the shaft 520 can only be operated in a step-by-step manner since the tension of the element 519 is sufficient to rotate the shaft 520 until the camming finger 519a bridges the nearest opening 503a in the event the shaft is operated to a position lying between two of these settings.

From the above explanation it will be understood that the operating shaft 520 is journaled for rotation in the two panels 501 and 502 and also in the plate 503. This shaft is also journaled in a sleeve member 523 which is fixedly secured to the plate 503 and is threaded to receive an assembly nut 527. The arrangement for mounting the device upon the sub-panel 301 comprises a U-shaped mounting bracket 521 having its legs secured to the panel 301 by means of assembly screws and its central web drilled to receive the sleeve 523. The central web portion of the bracket piece 521 is clamped between a spacing collar 522 which abuts the surface of the panel 503 and a lock washer 528 as the assembly nut 527 is screwed on the threaded sleeve 523. In order to maintain exact alignment between the radial positions of the two panels 501 and 502 which carry the contact pieces 131 and 132 and the front panel 300 upon which a portion of the indicating arrangement referred to above is inscribed or mounted, an aligning pin 524 is provided which extends through registering openings 525 and 526 in the plate 503 and the bracket piece 521, respectively, and is press-fitted into a third opening through the collar 522.

For the purpose of manually setting the rheostat 102 to any desired position, the shaft 520 is extended through openings provided in the two panels 301 and 300 and is equipped at its outer end with a knob 133. To indicate the relationship that exists between the ground speed of the craft from which the bombs are to be dropped and the spacing intervals between hits on the objective for any particular setting of the rheostat, the indicating arrangement illustrated in Figs. 4 and 6 of the drawings is provided. This arrangement includes an index or indexing plate arranged on the outer surface of the panel 300. This index comprises logarithmically scaled indicia designating the intervals between bomb hits in feet and is arranged to cooperate with an indexing element 405 scaled at its outer peripheral edge with numerically defined indicia of the ground speed of the craft in knots per hour. The element 405 is arranged to be driven from the shaft 520 through a gear train which comprises a driving gear 530 and a driven gear 531 having a predetermined ratio therebetween. More specifically, the gear 530 is mounted for rotation with the shaft 520 and is positioned to rotate between the two panels 300 and 301; the gear 531 is provided with a hub 531b journaled in an opening provided in the outer panel 300 and with a rearwardly disposed hub 531a journaled in an aligned opening provided in the sub-panel 301; and the indexing plate 405 is mounted upon the outer flat surface of the hub 531b by means of assembly screws 532.

In considering the manner in which the illustrated apparatus is utilized to control the bomb release mechanism 185, it may first be assumed that this mechanism is to be selectively controlled by the bombardier of an aircraft in which the equipment is installed to release bombs from this craft selectively one at a time. In such case, the master switch 168a is operated to its closed-circuit position; the switch 160 is operated to its select position wherein the contact springs 163 thereof are closed; and the counting device 170 is preset to the predetermined off-normal position which corresponds to the number of bombs that are to be dropped. In order to preset this device, the knob 181 is actuated to rotate the wheels 171 and 174 so that the pin 172 is moved to the off-normal position corresponding to the number of bombs to be released, this number being indicated by the coincidence of the pointer 181a with one of the indicia of the scale 403. As the pin 172 is moved away from its normal position, the contact springs 173 are moved into engagement to prepare a circuit for supplying current to the input side of the vibrator 165 and to prepare the operating circuit for the locking relay 140.

With the apparatus thus conditioned for operation, the button or key control switch 167 may be selectively operated by the bombardier of the aircraft to effect the release of the bombs at any desired intervals. Each time the contacts of this switch are closed a circuit is completed through the contact springs 173 for energizing the primary windings of the vibrator 165 and the winding of the locking relay 140 from the current source 168. In operating, the relay 140 prepares a locking circuit for itself at its contacts 143, and closes an obvious circuit for energizing the signal lamp 137. When voltage is applied to the input side of the vibrator 165 the normal rated output voltage appears across the output terminals 165b thereof to energize the pulsing relay 150 in a circuit which includes the contacts 163 and the resistor 164. In operating, the relay 150 closes its contacts 151 to complete a circuit including the source 168 for transmitting a current pulse to the bomb release mechanism 185, whereby this mechanism is actuated to release a bomb. At its contacts 154, the relay 150 completes an obvious circuit for energizing the stepping magnet 175. Incident to the operation of this magnet, the associated pawl mechanism is operated to rotate the wheels 171 and 174 in a direction such that the pin 172 is moved one step nearer its normal position. When the contacts of the switch 167 are opened, the relay 140, the signal lamp 137, the vibrator 165 and the pulsing relay 150 are all deenergized in an obvious manner. The relay 150, in releasing, opens its contacts 151 to terminate the current pulse transmitted to the bomb release mechanism 185. At its contacts 154, the relay 150 deenergizes the stepping magnet 175 of the counting device 170, whereby the pawl mechanism controlled by this magnet is released under the control of the leaf spring 180. In this regard it is noted that the suppressor circuit comprising the resistor 182 and the condenser 183 connected in shunt with the contacts 154, serves to protect these contacts against arcing and pitting during the opening and closing of the same. The condenser 184 is similarly connected in shunt with the contacts 151 to protect these contacts against arcing and pitting during the make and break periods thereof. The above-described operations are repeated each time the contacts of the switch 167 are closed and then opened. From this explanation it will be understood that a current pulse is transmitted to the mechanism 185 to effect the release of a bomb each time the relay 150 operates, and that the pin 172 of the counting device 170 is moved one step nearer its normal position each time the contacts of the switch 167 are closed. After a predetermined number of operations of this switch, the pin 172 of the counting device 170 is rotated back to its normal position wherein the contact springs 173 are moved out of engagement. Following the disengagement of these contact springs further operation of the switch 167 is without effect to cause the operation of the two relays 140 and 150.

In utilizing the apparatus to control the bomb release mechanism so that a train of bombs is automatically released thereby, the counting device 170 is operated to the setting corresponding to the desired number of bombs in the train; the rheostat 102 is adjusted to the position corresponding to the desired spacing interval between hits for the expected ground speed of the craft during the bombing operation; the power switch 168a is operated to its closed-circuit position; and the switch 160 is operated to its train position wherein the contacts 161 and 162 are closed. With the switch 168a closed and the switch 160 operated to its train position, an obvious circuit including the current source 168 is completed for energizing the cathode heater 100h of the control tube 100 in parallel with the signal lamp 137. It is noted in this regard that the heater 100h should be energized at least a full minute before the bombing operation is started.

After the above-described operations are performed, the switch 167 may be operated to initiate the release of the train of bombs. When the contacts of this switch are closed, a circuit is completed through the contact springs 173 for energizing the locking relay 140 and the primary windings of the vibrator 165 in parallel. In operating, the relay 140 closes its contacts 143 to complete a locking circuit for itself, this circuit extending from the positive terminal of the source 168 by way of the switch 168a, the contacts 162 and 143, the contact springs 173, and the winding of the relay 140 to the negative terminal of the current source. After this circuit is completed, the primary windings of the vibrator 165 are also energized in a circuit which includes the contacts 173, 143 and 162. Accordingly, the switch 167 may be released without interrupting or terminating the bomb release operation in progress. At the time the switch 167 is operated, the condenser 134 is short-circuited over a path which includes the contacts 153 and the encircuited resistance of the rheostat 102. The cathode 100c and the control grid 100g are therefore at substantially the same potential.

When the primary windings of the vibrator 165 are energized and the rated output voltage appears across the output terminals 165b of the vibrator, this voltage is positively applied to the screen electrode 100s of the tube 100 over a path including the resistor 139, and the winding of the relay 150 is energized by the space current flow through the tube 100. More specifically, the circuit for energizing this relay now extends from the positive output terminal 165b of the vibrator 165 by way of the winding of the relay 150, the contacts 161, the space current path between the anode 100a and the cathode 100c of the tube 100, and the encircuited section 101a of the biasing resistor 101 to the negative output terminal of the vibrator 165. When thus energized the relay 150 closes its contacts 151 to transmit a current pulse to the bomb release mechanism 185. At its contacts 154, the relay 150 closes the operating circuit for the stepping magnet 175, whereby the counting device 170 is operated to count the current pulse transmitted to the bomb release mechanism. At its contacts 153, the relay 150 opens the path short-circuiting the condenser 134. At its contacts 152, the relay 150 bridges the condenser 134 across the encircuited portion 101a of the biasing element 101 in series with the resistor 102' and the encircuited resistance of the rheostat 102.

After the condenser 134 is thus bridged across the resistor 102' and the resistor section 101a, the voltage drop appearing across these two elements as the result of the space current flow through the tube 100 causes a charging current to be delivered to the condenser through the encircuited resistance of the rheostat 102. As this condenser is charged, the voltage thereacross approaches a value equaling that of the voltage drop across the two resistor elements. In this regard it will be understood that the rate of the voltage build-up across the condenser 134 is determined by the amount of resistance included in the charging circuit, which resistance serially includes the encircuited section 101a of the resistor 101, the resistor 102' and the encircuited resistance of the rheostat 102. Thus if the series resistance of this circuit is low, the voltage across the condenser 134 will rapidly be increased to a value approaching that of the voltage drop across the resistor section 101a and the resistor 102'. On the other hand, if the series resistance of this circuit is high, a relatively much longer time interval will be required for the voltage across the condenser 134 to approach the voltage drop across the resistor section 101a and the resistor 102'. It will be noted that the charging current traverses the condenser 134 in a direction such that the resulting voltage thereacross biases the control grid 100g negatively with respect to the cathode 100c. As this bias voltage is increased, the space current flow through the tube 100 is decreased to decrease the voltage drop across the resistor section 101a and the resistor 102', whereby the charging rate of the condenser 134 is lowered. After a predetermined time interval, required for the condenser 134 to be charged to a voltage somewhat less than the voltage drop across the resistor section 101a and the resistor 102', the space current flow through the tube 100 is lowered to a value such that the relay 150 is insufficiently energized to remain operated. The relay 150 accordingly restores.

In releasing, this relay opens its contacts 151 to terminate the current pulse transmitted to the bomb release mechanism 185. At its contacts 154, the relay 150 deenergizes the stepping magnet 175 of the counting device 170. At its contacts 152, the relay 150 opens the above-described charging circuit for the condenser 134. At its contacts 153, the relay 150 completes the previously described circuit for discharging the condenser 134 through the encircuited resistance of the rheostat 102. After this discharge path is completed the condenser 134 starts to discharge through that portion of the rheostat resistance connected in shunt therewith, and as the condenser discharges the voltage thereacross decreases. Incident to the decrease of this bias voltage between the control grid 100g and cathode 100c of the tube 100, the space current flow through the tube is increased to increase the energization of the pulsing relay 150. Here again the rate of decay of the voltage across the condenser 134 is determined by the amount of rheostat resistance connected in shunt therewith. If the value of this resistance is low, the condenser 134 is rapidly discharged. On the other hand, if the value of this resistance is high the condenser 134 is only slowly discharged. It will be understood in this regard that the rate of discharge of the condenser 134 determines the time interval required for the space current flowing through the tube to rise to a value sufficient to cause the reoperation of the pulsing relay 150. When this value of space current is reached, the relay 150 reoperates to perform the functions described above. From this point on the above-described circuit control operations reoccur until such time as the pin 172 of the counting device 170 is driven back to its normal position under the control of the stepping magnet 175. In this regard it will be understood that the bomb release mechanism 185 operates to release a bomb each time a current pulse is transmitted thereto under the control of the pulsing relay 150.

When the pin 172 is returned to its normal position, the contact springs 173 controlled thereby are disengaged to cause the deenergization of the vibrator 165 and the relay 140 in an obvious manner. The relay 140, in restoring, opens its contacts 143 further to interrupt its locking circuit and the parallel circuit for energizing the primary windings of the vibrator 165. When this vibrator is deenergized the output voltage thereof is reduced to zero to cause a cessation in the space current flow through the tube 100 and thus effect the release of the pulsing relay 150. It will be understood, therefore, that the operation of the illustrated apparatus to transmit current impulses to the bomb release mechanism 185 is terminated when the control pin 172 of the counting device 170 is returned to its normal position. In order to deenergize the signal lamp 137 it is necessary to restore the key 160 to its normal position wherein the contacts 161 and 162 thereof are respectively disengaged.

From the above explanation it will be understood that the periodicity of operation of the pulsing relay 150 is determined by the time constants of the circuits for charging and discharging the condenser 134. It will also be understood that by suitable operation of the knob 133 to adjust the wipers 129 and 130 along the contact pieces 131 and 132, any desired portion of the rheostat resistance may be included in these circuits to change the time constants of these circuits accordingly. More specifically, as the encircuited resistance of the rheostat 102 is increased to increase the time constants of the charging and discharging circuits, the charging and discharging rates of the condenser 134 are lowered to decrease the periodicity at which the pulsing relay 150 is operated and released. Conversely, as the encircuited rheostat resistance is lowered to decrease the time constants of the charging and discharging circuits, the rate of charge and discharge of the condenser 134 is raised to increase the periodicity at which the pulsing relay 150 is operated and released. It has been found from actual tests that a substantially linear relationship exists between given increments of change in the encircuited rheostat resistance and the resulting increments of change in the periodicity of operation of the pulsing relay 150. In other words, changes in the pulsing rate of this relay are directly proportional to changes in the encircuited rheostat resistance. In the illustrated arrangement, the increments of resistance inserted in the condenser charging and discharging circuits as the rheostat is operated step-by-step from its low resistance setting to its high resistance setting are progressively decreased at each step, which means that the bomb interval spacing for a given ground speed of the craft is non-linearly related to the different positions of the rheostat control knob 133 and the different positions of the indexing plate 405. In the indicating arrangement comprising the scale 404 and the scale carried by the indexing element 405, the differences in the changes of rheostat resistance at different steps thereof are accounted for by utilizing logarithmically spaced scale indicia, which in the spacings therebetween, are so related to the pulsing rate for each setting of the rheostat as to provide an accurate indication of the relationship between bomb hit spacing and ground speed of the craft. The initial calibration of the scale 404 may be accurately determined by calculating, for a given ground speed of the craft, the pulsing rates of the relay 150 which are required for the different bomb hit spacings, and then calculating or experimentally determining the increments of rheostat resistance that are required between the different contact pieces of the rheostat to provide the desired pulsing rate at each setting of the rheostat. From the measured pulsing rate for each setting of the rheostat, the bomb hit spacing may then easily be ascertained and suitably identified in the scale 404 opposite the mark of the scale 405 which designates the ground speed at which the scale 404 is being calibrated. After the markings of the scale 404 are thus determined for one ground speed, the markings of the scale 405 may readily be determined, because of the direct ratio which exists between bomb hit spacing and ground speed of the craft.

As indicated by the above explanation, the resistance value of the resistor section 101a partially determines the magnitude of the average current flow through the winding of the relay 150 during the pulsing contact make periods thereof and hence the extent of each contact make period. This arrangement forms a convenient vehicle whereby the ratio of the make and break periods of the pulsing contacts 151, controlled by the relay 150, may be varied. Thus by decreasing the resistance value of the resistor section 101a, the make periods of the contacts 151 are increased to increase the ratio of the make to break periods. Conversely, by increasing the resistance of the resistor section 101a each make period of the contacts 151 may be decreased to lower the ratio of the make to break periods.

As previously indicated, so long as the potential positively applied to the screen electrode 100s of the tube is maintained substantially constant, full control of the magnitude of space current flow through the tube 100 is obtained by varying the bias on the control grid 100g thereof, regardless of wide variations in the voltage appearing across the output electrodes 165b of the vibrator 165. On this point it has previously been indicated that the voltage of the source 168 may vary from its rated value by as much as 10% plus or minus. Such variations in the voltage applied to the input terminals of the vibrator 165 will, in the usual commercial type of vibrator, result in substantial changes in the voltage across the output terminals thereof. In the illustrated arrangement, however, such variations in the voltage of the source from which the screen potential is derived do not materially change the applied potential of the screen electrode 100s. Thus immediately the output voltage appears across the terminals 165b of the vibrator 165, the discharge tube 138 is ionized. As this voltage tends to increase, due to an increase in the voltage across the terminals 165b, the current traversing the space current path of the tube 138 increases to increase the voltage drop across the resistor 139. Conversely, as the voltage across the output terminals 165b of the vibrator 165 decreases, the current drawn by the tube 138 through the resistor 139 is decreased. Due to this action the voltage across the electrodes of the tube 138, i. e., that positively applied to the screen electrode 100s, is stabilized at a predetermined value which may be equal to the rated screen voltage of the tube. As a result, those variations in the voltage applied to the anode 100a of the tube through the winding of the pulsing relay 150, do not deprive the control grid 100g from full control of the space current flowing through the tube. Thus the periodicity of operation of the pulsing relay 150 is rendered substantially independent of variations in the voltage appearing across the output terminals of the vibrator 165.

From the above explanation it will also be understood that wide changes in the temperature of the apparatus tend to vary the rate at which impulses are produced thereby. Thus, the measured resistance of the resistor elements 103, 104, 105, etc., included in the timing circuit, may vary as much as twenty-two percent over the operating temperature range. These elements all have a positive temperature coefficient of resistance. Other factors tending to contribute to a change in the pulsing rate with ambient temperature variations are changes in the resistance of the resistor 101 and the winding of the relay 150, and relative displacement of the elements of the tube 100. The net effect of the various factors is the same as that obtained by using a rheostat 102, the elements of which have a substantial positive coefficient of resistance, i. e., the pulsing rate increases with a decrease in the ambient temperature and vice versa. This effect is offset by the action of the resistor 102' included in the cathode circuit of the tube, which has a negative temperature coefficient of resistance and hence the effect of decreasing the pulsing rate of the apparatus as the ambient temperature decreases. It has been found that by using a resistor 102' of the character indicated and having the proper resistance value, the pulsing rate of the apparatus is substantially unaffected by wide variations in the temperature of the apparatus.

Referring now more particularly to Fig. 2 of the drawings, the apparatus there illustrated is substantially similar in construction and arrangement to that shown in Fig. 1 and described above. In fact, the apparatus as mechanically shown in Figs. 3 to 6, inclusive, of the drawings may be wired either in accordance with the circuit of Fig. 1 or that of Fig. 2, corresponding reference characters differing only in the hundreds digit being used to identify corresponding parts of the two circuits. It will be noted that in the Fig. 2 arrangement the voltage regulating gaseous discharge tube 238, which is provided for maintaining the screen potential 200s of the control tube 200 constant, is connected directly between this electrode and the associated cathode 200c. This arrangement has the advantage that the constancy of the potential applied to the screen electrode is measured as between this electrode and the cathode rather than between the screen electrode and ground. Thus variations in the space current flow through the cathode resistor 201 occasioned by variations in the bias applied to the control grid 200g do not alter the potential difference between the screen electrode 200s and the cathode 200c. Accordingly, the magnitude of space current flow through the tube 200 is determined substantially entirely by the bias applied to the control grid 200g.

It also will be noted that in the Fig. 2 arrangement a voltage divider 235 is provided which is connected between the cathode 200c and the grounded negative output terminal 265b of the vibrator 265. The adjustable tap or wiper of this voltage divider is connected to the wipers of the rheostat 202 so that a variable portion of the voltage drop across the resistor 235 is normally impressed across the electrodes of the bias determining condenser 234.

In considering the manner in which the circuit arrangement illustrated in Fig. 2 functions, it may first be assumed that the bomb release mechanism is to be controlled to release bombs selectively one at a time. In such case, the power switch 268a is operated to its closed-circuit position and the switch 260 is operated from its illustrated normal position to its select position wherein the contacts 262a, 262b and 262c are respectively engaged. After the power switch 268a is closed, and when the switch 260 is operated to its select position, a circuit including the contacts 262a is completed for energizing the primary windings of the vibrator 265 in parallel with the filament of the signal lamp 237. The energization of this lamp provides a signal that the switch 260 occupies one of its two off-normal positions. When energizing current is delivered to the primary windings of the vibrator 265, an output voltage appears across the output terminals 265b which serves to energize the relay 250 in a circuit which includes the resistor 239' and the engaged key contacts 262c. In operating, the relay 250 closes its contacts 251 to prepare the available circuit for transmitting current impulses to the bomb release mechanism 285. At its contacts 254 and 255, the relay 250 prepares the operating circuit for the stepping magnet 275 of the counting device 270 and one of the circuits for energizing the relay 240.

With the apparatus thus conditioned for operation, the button or key-controlled switch 267 may be selectively operated by the bombardier of the aircraft to effect the release of the bombs at any desired intervals. Each time the contacts of this switch are closed, a circuit is completed through the contacts 262b for energizing the locking relay 240 from the current source 268. In operating, the relay 240 closes its contacts 241 to transmit a current pulse through the contacts 251 to the bomb release mechanism 285, whereby this mechanism is actuated to release a bomb. The remaining circuit switching operations performed by the relay 240 are of no effect in the case under consideration wherein the switch 260 occupies its select position. When the contacts of the switch 267 are opened, the relay 240 is deenergized in an obvious manner. In releasing, this relay opens its contacts 241 to interrupt the current pulse transmitted to the bomb release mechanism 285. In this regard it is noted that the condenser 284 shunting the series-connected contacts 241 and 251 serves to protect the contacts 241 against arcing and pitting as these contacts are opened and closed to transmit current impulses to the bomb release mechanism. The above-described operations are repeated each time the contacts of the switch 267 are closed and then opened. From this description, it will be understood that a current impulse is transmitted to the release mechanism 285 each time the switch 267 is operated and then released to cause the operation and release of the relay 240. This mechanism responds to each received impulse by releasing a single bomb. After the desired number of bombs have been dropped, the switch 260 may be restored to its normal position to cause the deenergization of the vibrator 265, the relay 250 and the signal lamp 237.

In utilizing the apparatus illustrated in Fig. 2 of the drawings to control the bomb release mechanism 285 so that a train of bombs is automatically released thereby, the power switch 268a is operated to its closed circuit position; the counting device 270 is operated to the setting corresponding to the desired number of bombs in the train; the rheostat 202 is adjusted to the position corresponding to the desired spacing interval between bomb hits for the expected ground speed of the craft during the bombing operation; and the switch 260 is operated to its train position wherein the contacts 261a, 261b and 261c are respectively engaged. With the power switch 268a closed and the counting device 270 preset so that the control pin 272 thereof occupies an off-normal position, a circuit including the contacts 273a is completed for energizing the cathode heater 200h, the signal lamp 237, and the primary windings of the vibrator 265 in parallel. It is noted in this regard that the cathode heater 200h should be energized at least a full minute before the bombing operation is started.

Following the operations just described, and when the rated output voltage of the vibrator 265 appears across the output terminals 265b thereof, this voltage is positively applied to the screen electrode 200s of the tube 200 over a path including the resistor 239, and the relay 250 is energized in a circuit which includes the space current path of the tube 200 and the voltage dividing resistors 235 and 201 in parallel. When thus energized the relay 250 closes its contacts 251 to prepare the circuit for transmitting current impulses to the bomb release mechanism 285 and, at its contacts 254 and 255, prepares the operating circuit for the stepping magnet 275 of the counting device 270 and a circuit for energizing the relay 240. At its contacts 253, the relay 250 opens a point in the circuit over which the condenser 234 may be discharged. At its contacts 252, the relay 250 prepares a circuit for charging this condenser to a value approaching that appearing across the resistor section 201a and the resistor 202', which results from space current flow through the tube 200.

After space current flow through the tube has been initiated in the manner explained above, the space current traversing the resistor 202' and the resistor section 201a of the biasing element 201 produces a voltage drop across these series connected elements which is impressed across the voltage dividing resistor 235. A portion of this voltage, i. e., that appearing across the resistor section 235a, is impressed across the electrodes of the condenser 234 through the encircuited resistance of the rheostat 202. After a short time interval, and before the bomb release switch 267 is operated, the condenser 234 is charged to the full value of the voltage across the resistor section 235a. This voltage, it will be noted, is negatively applied to the control grid 200g of the tube 200 to reduce the space current flow through the tube. By adjusting the wiper along the voltage dividing resistor 235, the extent of this bias voltage may be varied at will. Preferably this adjustment is so carried out that the magnitude of the space current flowing through the tube 200 only slightly exceeds that required to operate the relay 250 after this relay has been released. The purpose of thus preliminarily biasing the control grid 200g by charging the condenser 234 to a predetermined value is that of preventing the first release period of the relay 250, following the operation of the bomb release switch 267, from being unduly long.

After the above-described operations are completed, the bomb release switch 267 may be operated to initiate the release of the train of bombs. When the contacts of this switch are closed a circuit is completed through the contacts 261b and 273b for energizing the locking relay 240 from the current source 268. In operating, the relay 240 closes its contacts to complete a locking circuit for itself which extends from the positive terminal of the source 268 by way of the power switch 268a, the contacts 261c, 243 and 273b, and the winding of the relay 240 to the negative terminal of the source 268. A parallel branch of this circuit extends through the contacts 255 and 245. After this locking circuit is established, the switch 267 may be released without interrupting or terminating the bomb release operation in progress. At its contacts 241, the relay 240 closes the above-described circuit for transmitting a current pulse to the bomb release mechanism 285. At its contacts 246, the relay shunts the contact springs 273a of the counting device to complete obvious multiple circuits for energizing the cathode heater 200h, the signal lamp 237 and the primary windings of the vibrator 265. At its contacts 244, the relay 240 completes the prepared operating circuit for the stepping magnet 275, this circuit extending from the positive terminal of the current source 268 by way of the power switch 268a, the contacts 261c and 243, the winding of the magnet 275, and the contacts 254 and 244 to the negative terminal of the source 268. When its operating magnet is thus energized, the counting device 270 is operated to count the current impulse transmitted to the bomb release mechanism 285.

At its contacts 242, the relay 240, in operating, completes the previously mentioned circuit for charging the condenser 234 to a voltage sufficient to cause the release of the pulsing relay 250. Thus when these contacts are closed, the condenser 234 is bridged across the resistor 202' and the resistor section 201a of the biasing element 201 over a path which includes the encircuited resistance of the rheostat 202 and the contacts 252, 242 and 261a. It will be noted that incident to this switching operation, the lower portion 235b of the resistor 235 is short-circuited and the series resistor elements 202' and 201a are connected directly in parallel with the resistor 235a. The resistance value of the resistor section 235a is, however, several times that of the series resistance of the two resistor elements 202' and 201a, and hence the time constant of the condenser charging circuit is not materially influenced by the resistor section 235a. When the above-described charging circuit is completed, the voltage across the condenser 234, i. e., the bias voltage negatively applied to the control grid 200g, starts to rise at a rate determined by the setting of the rheostat 202. Here again if the encircuited resistance of the rheostat 202 is low, such that the series resistance of the charging circuit is small, the voltage across the condenser 234 will rapidly rise to a value approaching that of the voltage drop across the resistor elements 202' and 201a. On the other hand, if the encircuited resistance of the rheostat 202 is high, a relatively much longer time interval will be required for the voltage across the condenser 234 to rise to a value approaching the voltage drop across the resistor elements 202' and 201a. After a predetermined time interval, determined by the time constant of the charging circuit and hence by the setting of the rheostat 202, the bias voltage across the condenser 234 is increased to a point such that the space current flow through the tube 200 is insufficient to retain the pulsing relay 250 in its operated position. This relay accordingly restores.

In releasing, the relay 250 opens its contacts 251 to terminate the current pulse transmitted to the bomb release mechanism 285. At its contacts 255, the relay 250 opens one of the locking circuits for the relay 240. At its contacts 254, the relay 250 deenergizes the stepping magnet 275 of the counting device 270. At its contacts 252, the relay 250 opens the above-described charging circuit for the condenser 234. At its contacts 253, the relay 250 completes an obvious circuit for discharging the condenser 234 through the encircuited resistance of the rheostat 202. After this condenser discharge circuit is established, the condenser 234 starts to discharge through that portion of the rheostat resistance connected in shunt therewith, and as it discharges the voltage thereacross decreases. Incident to the decrease of this bias voltage between the control grid 200g and the cathode 200c of the tube 200, the space current flow through the tube rises to increase the energization of the pulsing relay 250. Here again, the rate of decay of the voltage across the condenser 234 is determined by the amount of rheostat resistance connected in shunt therewith. Thus if the value of this resistance is low the condenser 234 is rapidly discharged. On the other hand, if the value of this resistance is high the condenser 234 is only slowly discharged. It will be understood in this regard that the rate of discharge of the condenser 234 determines the time interval required for the space current flowing through the tube 200 to rise to a value sufficient to cause the reoperation of the pulsing relay 250. When this value of space current is reached, the relay 250 reoperates to perform the functions described above. From this point on the above-described circuit control operations reoccur until such time as the pin 272 of the counting device 270 is driven back to its normal position under the control of the stepping magnet 275. It will be understood in this regard that the bomb release mechanism 285 operates to release a bomb each time a current impulse is transmitted thereto under the control of the pulsing relay 250.

When the relay 250 is operated to transmit the current pulse required for effecting the release of the last bomb of the train, it recloses its contacts 255 to shunt the contact springs 273b of the counting device 270 and thus establish the above-described multiple locking circuit for the relay 240. Thus the relay 240 is prevented from releasing to prematurely terminate the current pulse being transmitted to the bomb release mechanism 285, in response to the separation of the contact springs 273b which occurs shortly after the last operation of the relay 250. In this regard it will be noted that when the counting device 270 is operated to count the last current pulse transmitted to the bomb release mechanism 285, the pin 272 is returned to its normal position to effect the disengagement of the contact springs 273b and 273a, respectively. At the contact springs 273a, the initially completed circuit for energizing the primary windings of the vibrator 265 in parallel with the filament of the lamp 237 and the cathode heater 200h, is opened. This circuit is, however, held closed at the contacts 246 of the locking relay. When the relay 250 thereafter releases to terminate the last current pulse transmitted to the bomb release mechanism 285, it opens its contacts 255 to interrupt the only remaining locking circuit for the locking relay 240. The relay 240 now restores and impulse transmission to the release mechanism 285 is terminated. In releasing, this relay opens its contacts 246 to deenergize the cathode heater 200h, the lamp 237 and the primary windings of the vibrator 265. Following the release of the relay

240, the key 260 may be returned to its normal position completely to restore the apparatus to normal, or the counting device 270 may be re-operated to a desired setting and the bomb release key 267 operated to initiate the release of another train of bombs. The manner in which these operations may be performed, and the operations resulting therefrom, will be clearly apparent from the preceding explanation.

From the above description it will be understood that the effect of varying the encircuited resistance of the rheostat 202 is exactly the same as that obtained by varying the encircuited resistance of the rheostat 102 in the Fig. 1 circuit arrangement. This effect, it will be recalled, is that of changing the periodicity at which the current pulses are transmitted to the bomb release mechanism 285. It is also pointed out that the resistor 202', having a negative temperature coefficient of resistance, functions in the same manner as the corresponding resistor 102' of the Fig. 1 arrangement, in that it prevents the pulsing rate of the apparatus from being substantially altered as a result of wide variations in the temperature of the apparatus. It will be noted further that the effect of varying the resistance of the encircuited portion 201a of the biasing resistor 201 is also the same as that realized by changing the setting of the adjustable resistor 101 provided in the Fig. 1 circuit arrangement. Thus it will be apparent that by changing the setting of the adjustable resistor 201 the ratio between the make and break periods of the pulsing contacts 251 may be varied as desired.

While two embodiments of the invention have been disclosed, it will be understood that various modifications may be made therein which are within the true spirit and scope of the invention.

What is claimed is:

1. In a circuit for automatically controlling the bomb release mechanism of an aircraft to release at timed intervals a train of bombs that are to hit an objective with a predetermined but variable spacing therebetween for different ground speeds of the aircraft, a network comprising an electronic interrupter having a time constant which determines the time interval separating the release of successive bombs of the train, a stationary indexing element, a movable indexing element, one of said indexing elements having indicia thereon which indicates different ground speeds of the aircraft and the other of said elements having indicia thereon which indicates different spacing intervals between bomb hits on the objective, and means controlled in accordance with the movement of said movable indexing element for adjusting the time constant of said circuit so that the spacing interval between hits on the objective is that indicated by said other indexing element for the ground speed at which the aircraft is traveling.

2. In apparatus for automatically controlling the bomb release mechanism of an aircraft to released at timed intervals a train of bombs that are to hit an objective with a predetermined but variable spacing therebetween for each of a plurality of different ground speeds of the aircraft, a vacuum tube interrupter for determining said timed intervals, a circuit network for said interrupter including an adjustable circuit element for varying the interval separating the release of successive bombs of the train, a plurality of indicating elements each designating a different ground speed, a scale graduated in terms of bomb hit spacing, and means for adjusting said adjustable circuit element and for correspondingly changing the relative positions of said scale and said indicating elements so that the bomb hit spacing for each of said different ground speeds is indicated thereby.

3. In apparatus for automatically controlling the bomb release mechanism of an aircraft to release at timed intervals a train of bombs that are to hit an objective with a predetermined but variable spacing therebetween for each of a plurality of different ground speeds of the aircraft, a vacuum tube interrupter including an adjustable circuit element for varying the interval separating the release of successive bombs of the train, a plurality of indicating elements each designating a different bomb hit spacing, a scale graduated to indicate different ground speeds of the aircraft, and means for adjusting said adjustable circuit element and for correspondingly changing the relative positions of said scale and said indicating elements so that the relationship between the different bomb hit spacings and the ground speeds of the aircraft are indicated at any setting of said adjustable circuit element.

4. In apparatus for automatically controlling the bomb release mechanism of an aircraft to release at timed intervals a train of bombs that are to hit an objective with a predetermined but variable spacing therebetween for each of a plurality of different ground speeds of the aircraft, an electronic interrupter including an adjustable circuit element for varying the interval separating the release of successive bombs of the train, a scale graduated in terms of bomb hit spacing, a cooperating scale graduated to indicate different ground speeds of the aircraft, and means for adjusting said adjustable circuit element and for correspondingly changing the relative positions of said scales so that the relationship between the different bomb hit spacings and the different ground speeds of the aircraft are indicated at any setting of said adjustable circuit element.

5. In a circuit for automatically controlling the bomb release mechanism of an aircraft to release at timed intervals a train of bombs that are to hit an objective with a predetermined spacing therebetween, a network having elements establishing a time constant which determines the time interval separating the release of successive bombs of the train, adjustable indicating means adapted to be set to indicate the ground speed of the aircraft, means controlled in accordance with the operation of said indicating means for adjusting said elements to vary the time constant of said network so that the time interval separating the release of successive bombs of the train is adjusted to the ground speed of the aircraft to maintain said predetermined spacing between bomb hits on the objective, and temperature compensating means for compensating for changes in said elements resulting from temperature variations thereby preventing wide variations in the temperature of the elements of the circuit from altering the rate at which bombs are released in trains.

6. In a circuit for automatically controlling the bomb release mechanism of an aircraft to release at timed intervals a train of bombs that are to hit an objective with a predetermined but variable spacing therebetween for a given ground speed of the aircraft, a network having circuit elements establishing a time constant which determines the time interval separating the release of successive bombs of the train, adjustable indicating means adapted to be set to indicate different spacings between bomb hits on the objective, means controlled in accordance with the operation of said indicating means for adjusting said elements to vary the time constant of said network so that the spacing interval between hits on the objective corresponds to the setting of said indicating means when the aircraft is traveling at said given ground speed, and temperature compensating means for compensating for changes in said elements resulting from temperature variations thereby preventing wide variations in the temperature of the elements of the circuit from altering the rate at which bombs are released in trains.

7. In a system for transmitting impulses over a control circuit, a circuit including an electronic pulser and adjustable timing means for determining the rate at which impulses are transmitted over said control circuit, adjustable indicating means adapted to be set to indicate the rate of impulse transmission over said control circuit, means controlled in accordance with the operation of said indicating means for imparting a corresponding setting to said timing means, and temperature compensating means for compensating for changes in said circuit resulting from temperature variations thereby preventing the rate of impulse transmission over said control circuit from varying due to changes in the temperature of the elements of said second-named circuit.

8. In a system for transmitting impulses over a control circuit, an electron discharge tube including an anode, a cathode and a control electrode, an output circuit including said anode and cathode and a control device for transmitting impulses over said control circuit, an input circuit including a timing network controlled by said control device to vary the bias voltage on said control electrode so that said control device is periodically operated and released, and means comprising a temperature compensating device common to said input and output circuits for compensating for changes in said circuits resulting from temperature variations thereby preventing ambient temperature variations from substantially altering the periodicity of operation of said control device.

9. In a system for transmitting impulses over a control circuit, an electron discharge tube including an anode, a cathode and a control electrode, an output circuit including said anode and cathode and a control device for transmitting impulses over said control circuit, an input circuit including a timing network controlled by said control device to vary the bias voltage on said control electrode so that said control device is periodically operated and released, means for adjusting the ratio between the operated and non-operated intervals of said control device without substantially altering the periodicity of operation of said control device, and means comprising a temperature compensating device common to said input and output circuits for compensating for variations in said circuits resulting from temperature changes thereby preventing ambient temperature variations from substantially altering the periodicity of operation of said control device.

10. In a system for transmitting impulses over a control circuit, an electron discharge tube including an anode, a cathode and a control electrode, an output circuit including said anode and cathode and a control device for transmitting impulses over said control circuit, an input circuit including a timing network controlled by said control device to vary the bias voltage on said control electrode so that said control device is periodically operated and released, a resistor having a negative temperature coefficient of resistance and included in said output circuit, thereby preventing changes in temperature of the elements of said circuits from altering the periodicity of operation of said control device, and an adjustable resistor included in said output circuit in series with said first-named resistor, said serially related resistors being bridged by said timing network.

EDWARD S. PETERSON.